(12) United States Patent
Li

(10) Patent No.: US 8,235,566 B2
(45) Date of Patent: Aug. 7, 2012

(54) STRADDLE-TYPE VEHICLE

(75) Inventor: Tzu-Pin Li, Taoyuan County (TW)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 386 days.

(21) Appl. No.: 12/678,804

(22) PCT Filed: Sep. 16, 2008

(86) PCT No.: PCT/JP2008/066685
§ 371 (c)(1),
(2), (4) Date: Mar. 18, 2010

(87) PCT Pub. No.: WO2009/038053
PCT Pub. Date: Mar. 26, 2009

(65) Prior Publication Data
US 2010/0195341 A1    Aug. 5, 2010

(30) Foreign Application Priority Data

Sep. 18, 2007    (JP) ................................ 2007-241644

(51) Int. Cl.
F21V 33/00    (2006.01)
(52) U.S. Cl. ......... 362/475; 362/473; 362/474; 362/476

(58) Field of Classification Search ........... 362/459–549
See application file for complete search history.

(56) References Cited

U.S. PATENT DOCUMENTS

2006/0048991 A1    3/2006    Sunaguchi et al.

FOREIGN PATENT DOCUMENTS

| CN | 1373067 A | 10/2002 |
|---|---|---|
| CN | 2607306 Y | 3/2004 |
| JP | 2001-039373 A | 2/2001 |
| JP | 2003-165477 A | 6/2003 |
| JP | 2006-069404 A | 3/2006 |
| JP | 2006-199292 A | 8/2006 |
| JP | 2007-038727 A | 2/2007 |
| JP | 2007-038865 A | 2/2007 |

Primary Examiner — William Carter
(74) Attorney, Agent, or Firm — Rabin & Berdo, P.C.

(57) ABSTRACT

A motorcycle is provided with a head light and an auxiliary light that are arranged along an up and down direction of a vehicle, and is provided with a front cover that can cover at least a portion of the legs of a rider. The respective lenses of the head light and the auxiliary light are arranged to be exposed in a forward portion of the vehicle. The front cover has an outside cover that is formed on both sides of the head light and the auxiliary light, and a head light cover that is formed in a portion closer to a center of the front cover than the outside cover. The head light and the auxiliary light protrude forward of the front edge of the outside cover. The head light cover protrudes forward of the outside cover.

9 Claims, 17 Drawing Sheets

[Fig. 1]
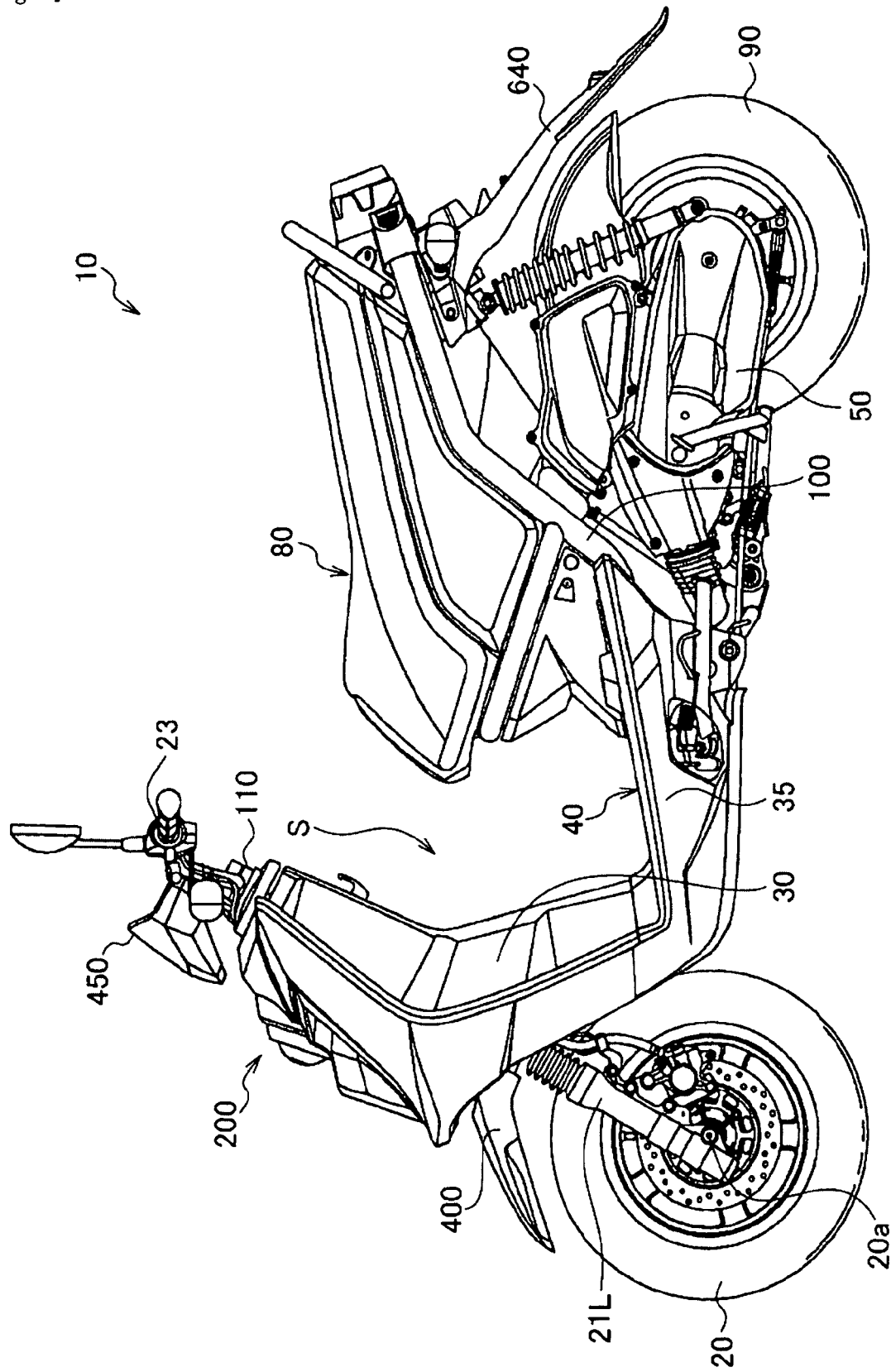

[Fig. 2]
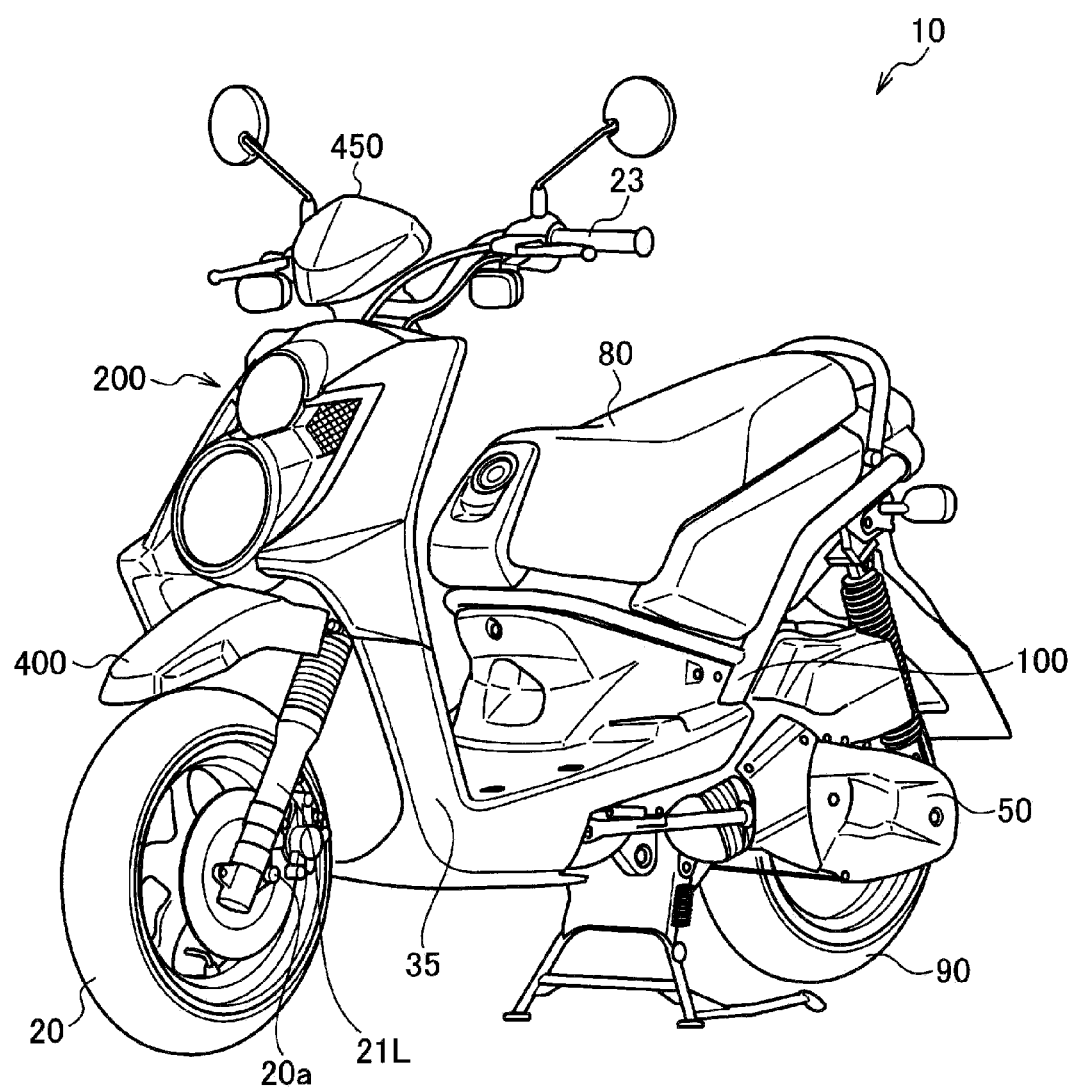

[Fig. 3]
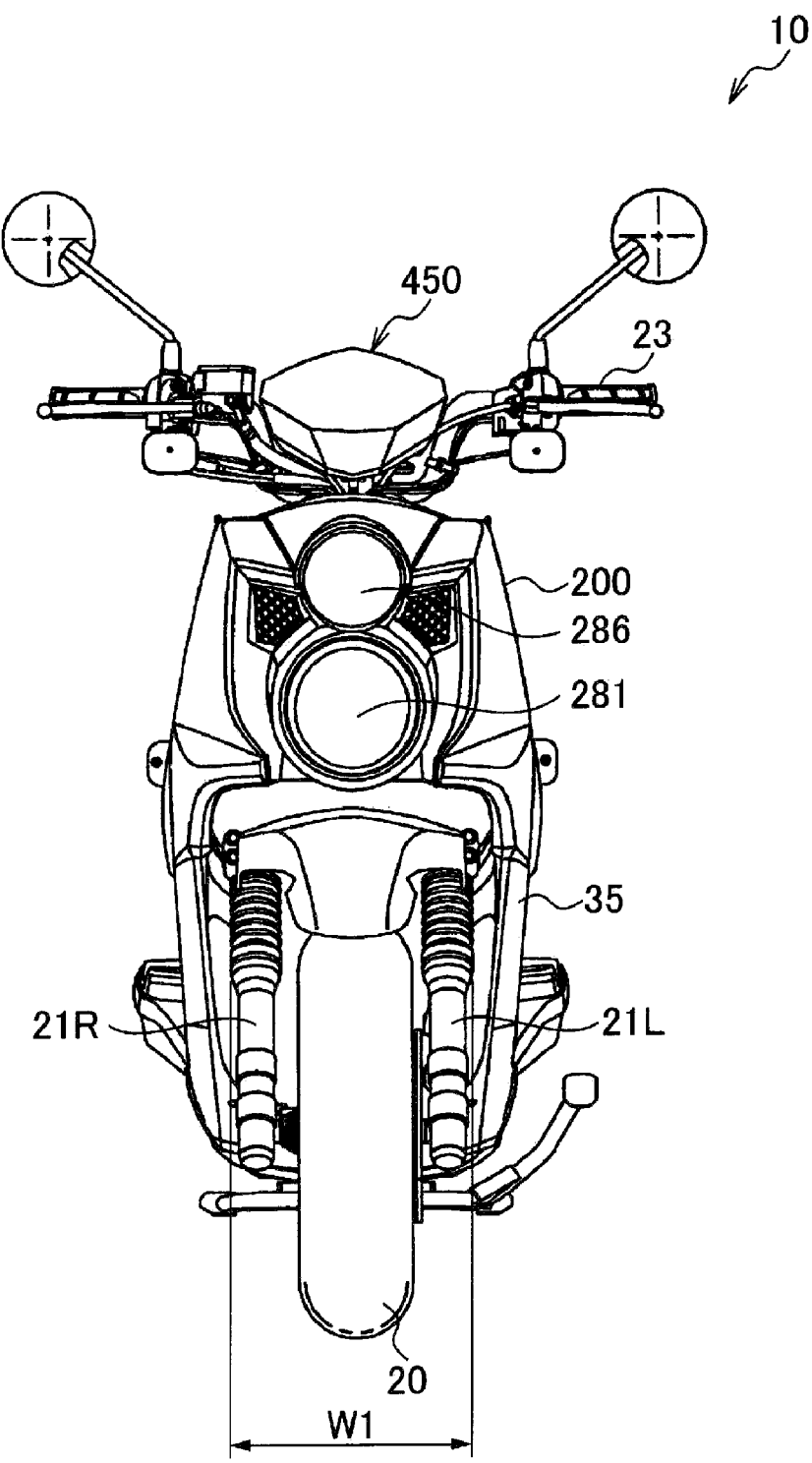

[Fig. 4]
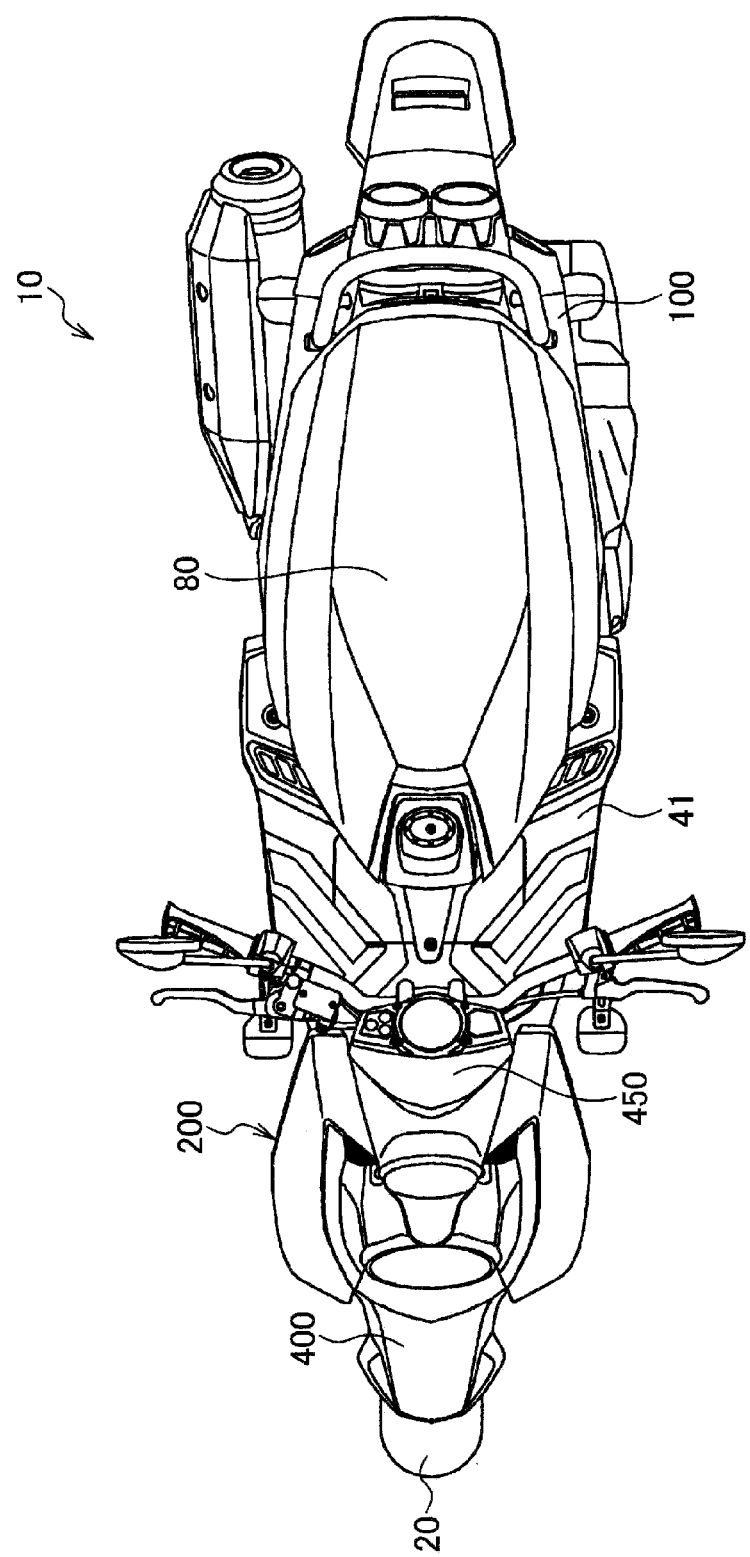

[Fig. 5]
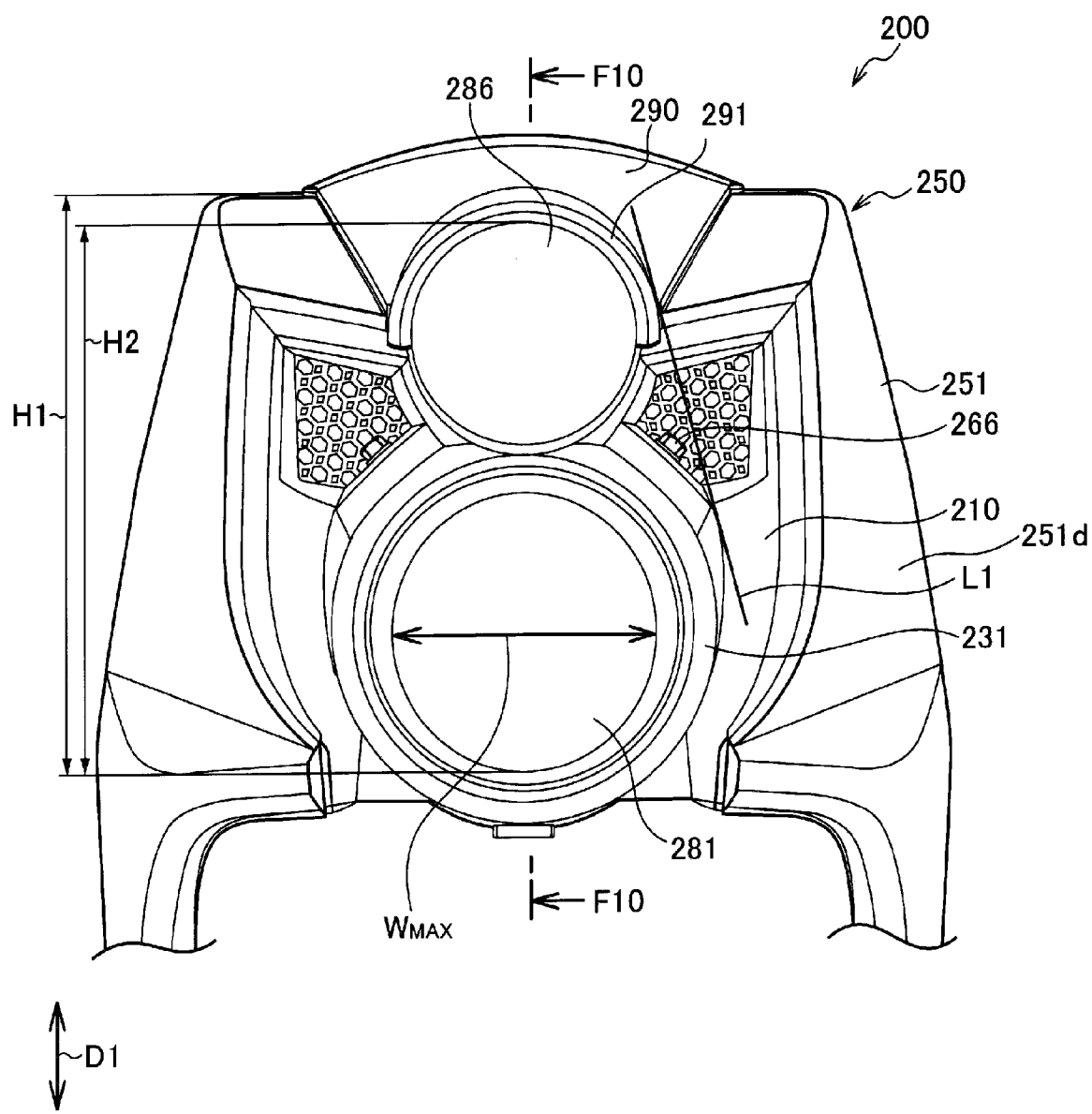

[Fig. 6]
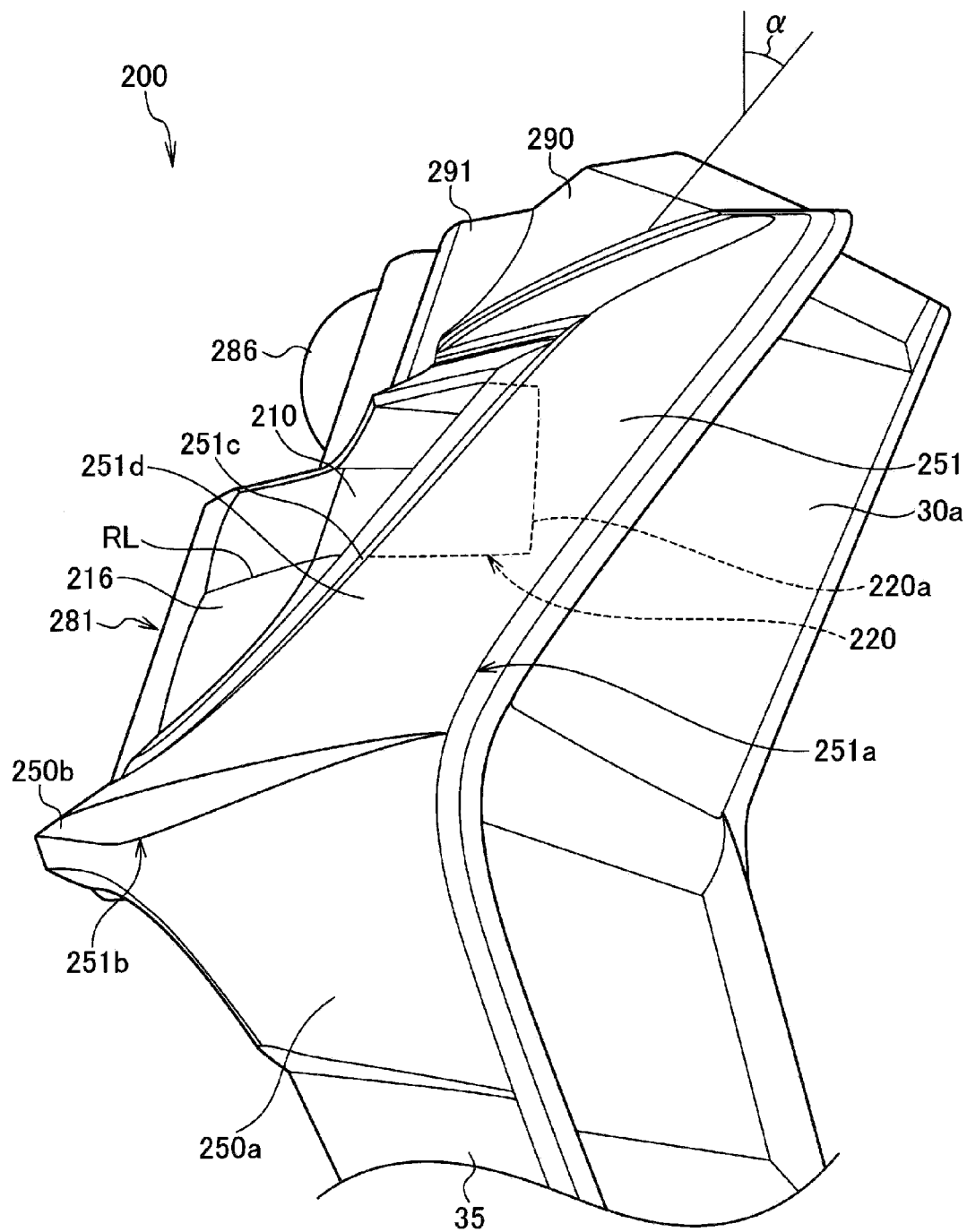

[Fig. 7]
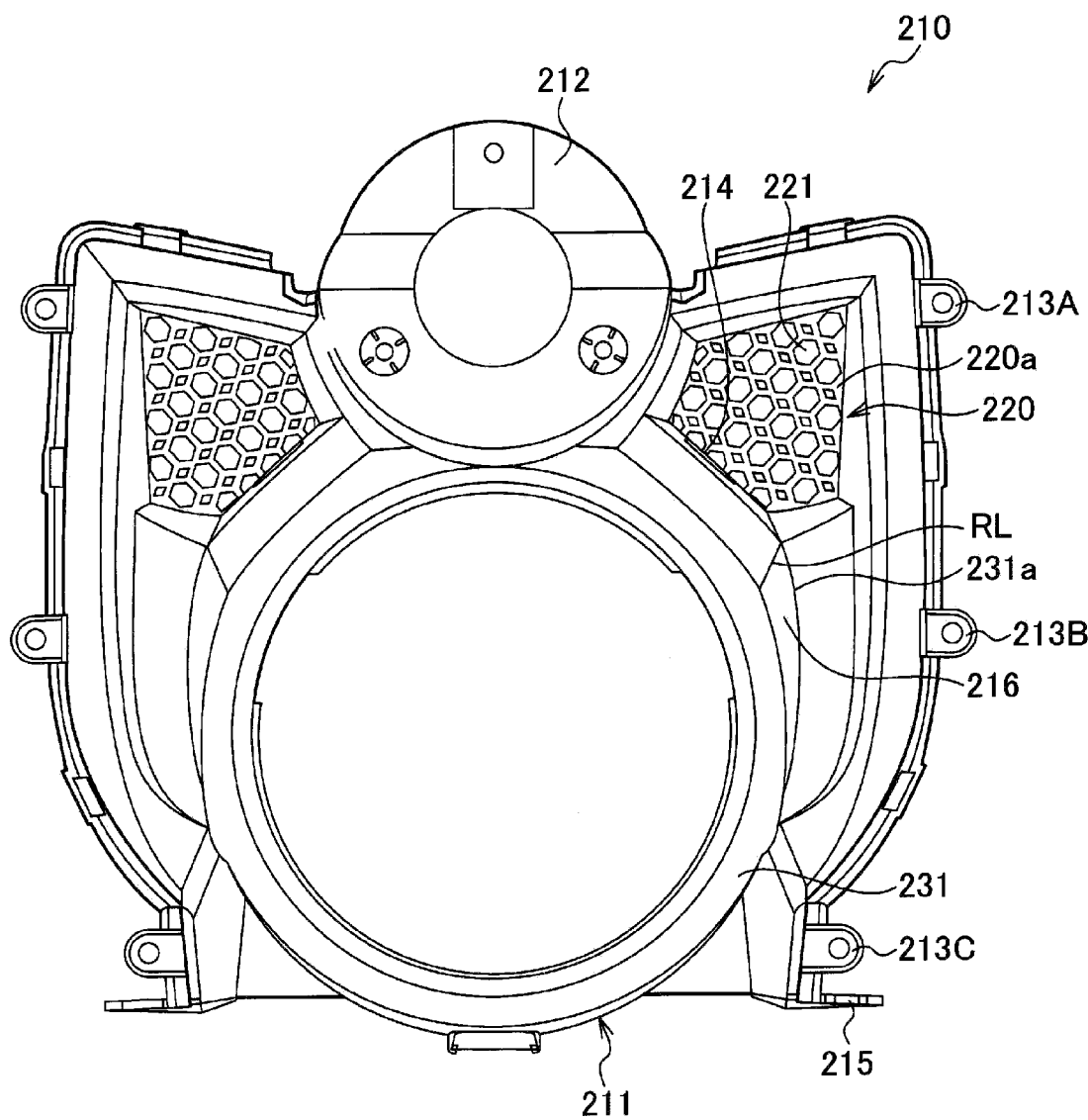

[Fig. 8]
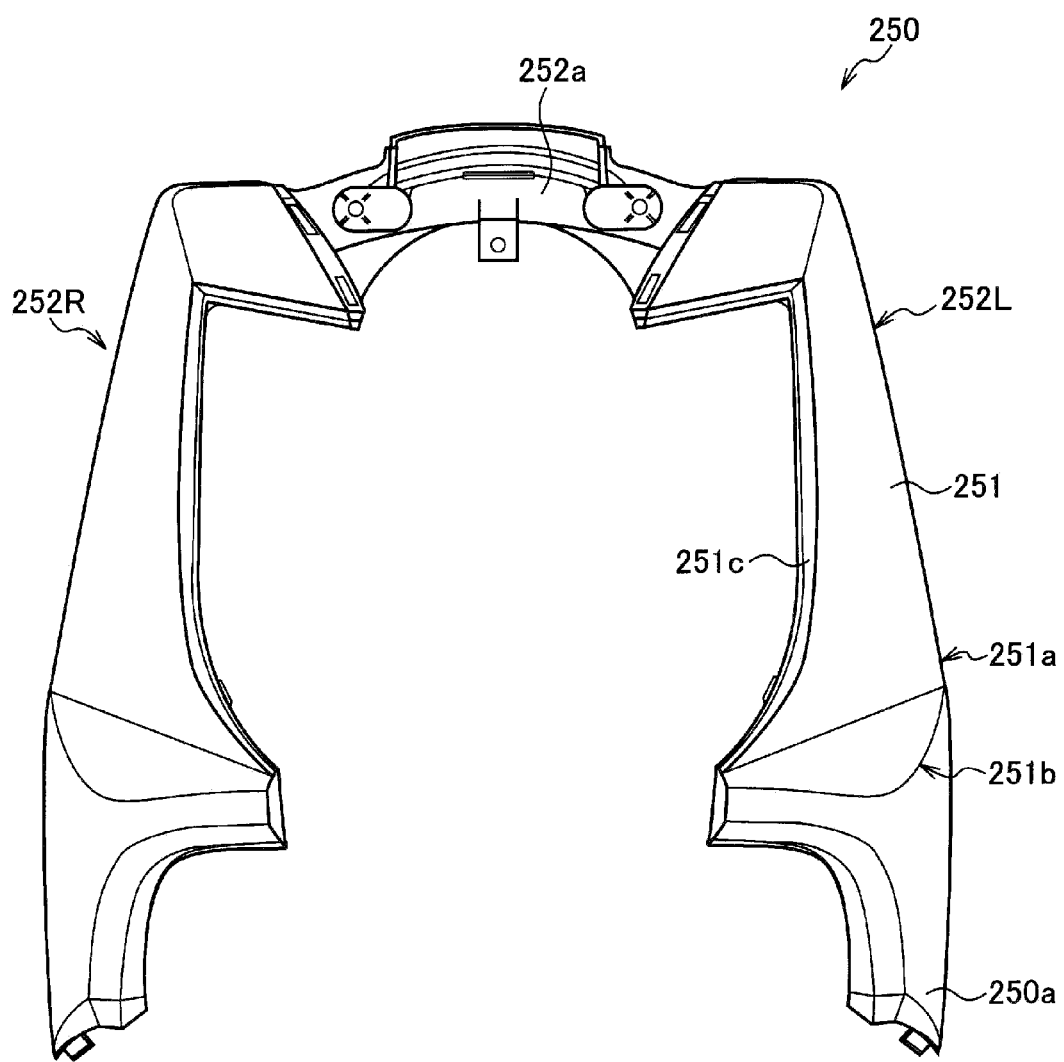

[Fig. 9]
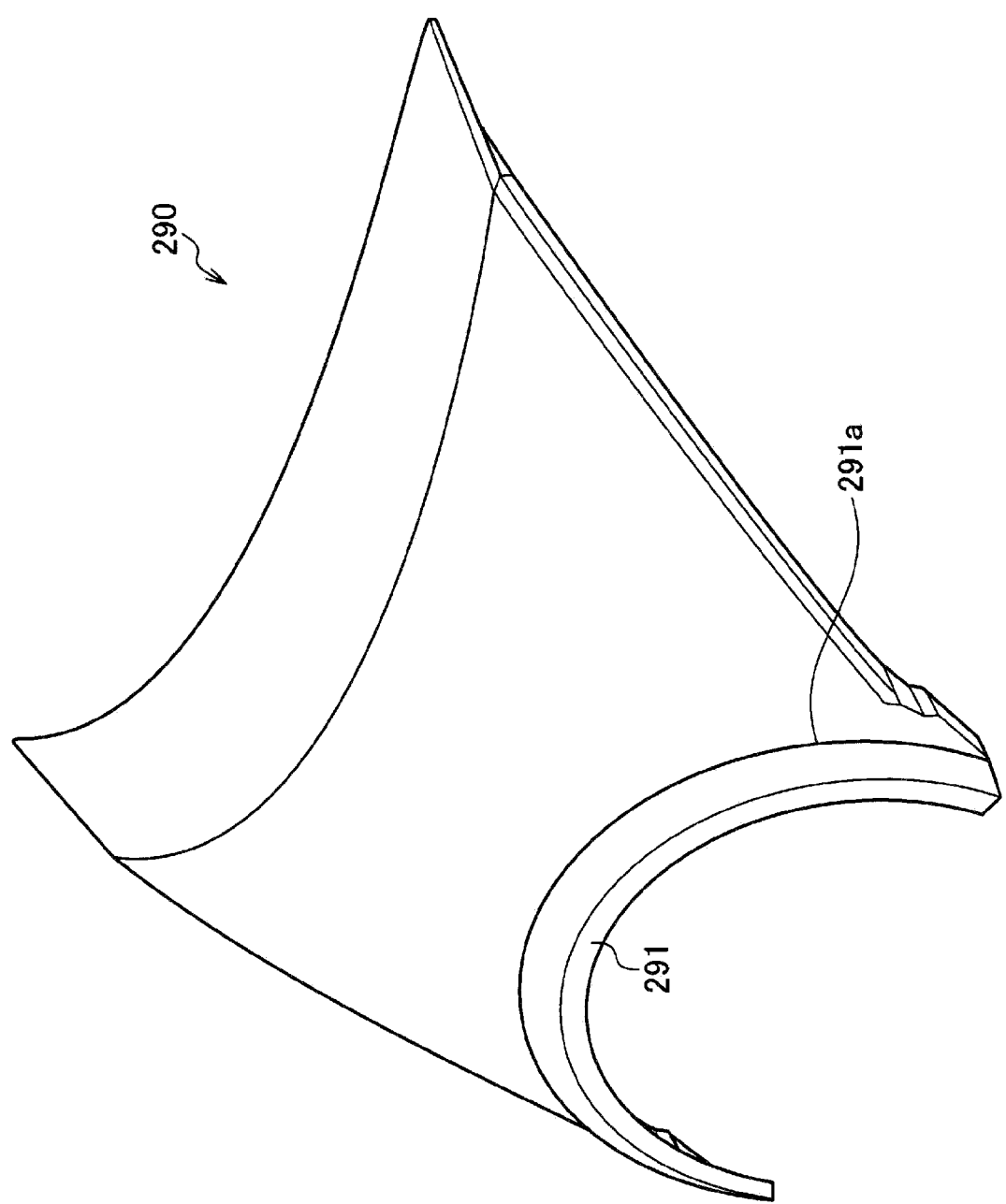

[Fig. 10]
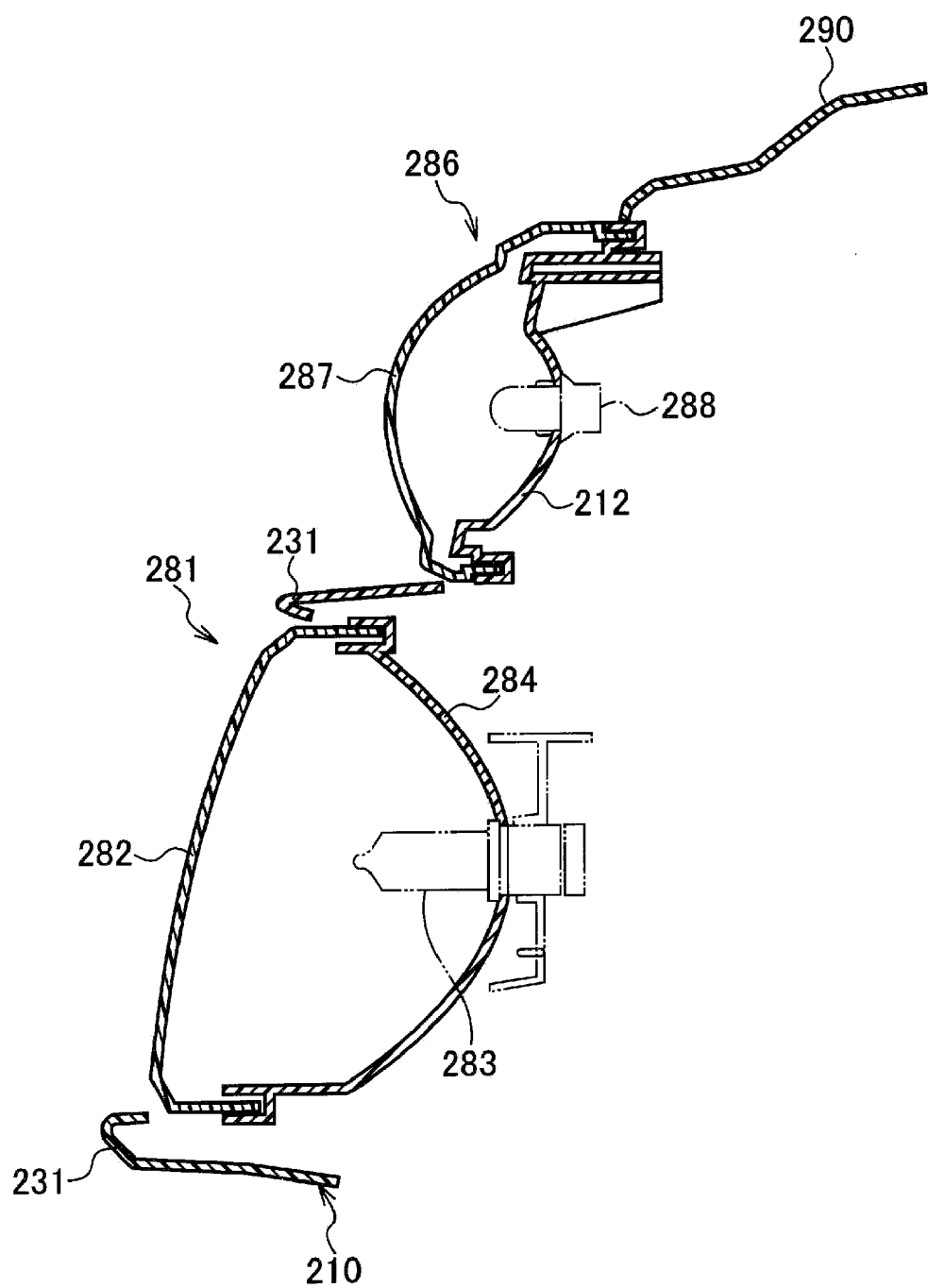

[Fig. 11]
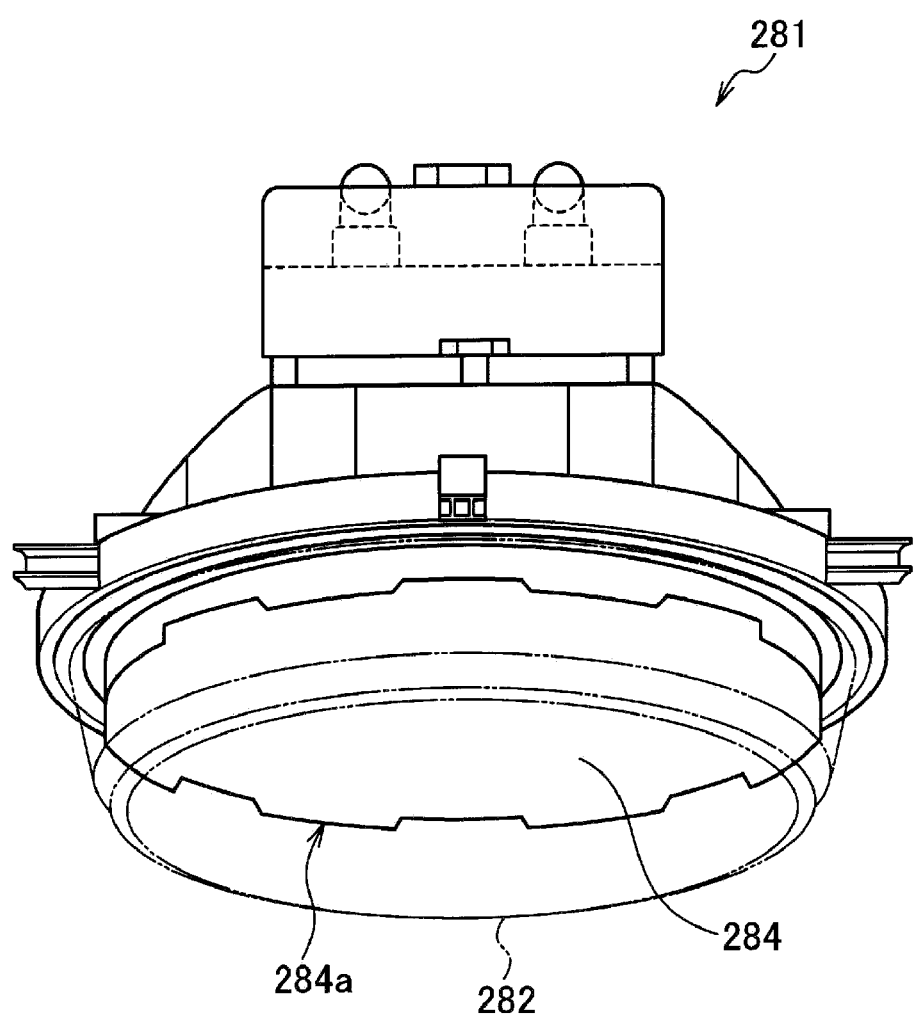

[Fig. 12]
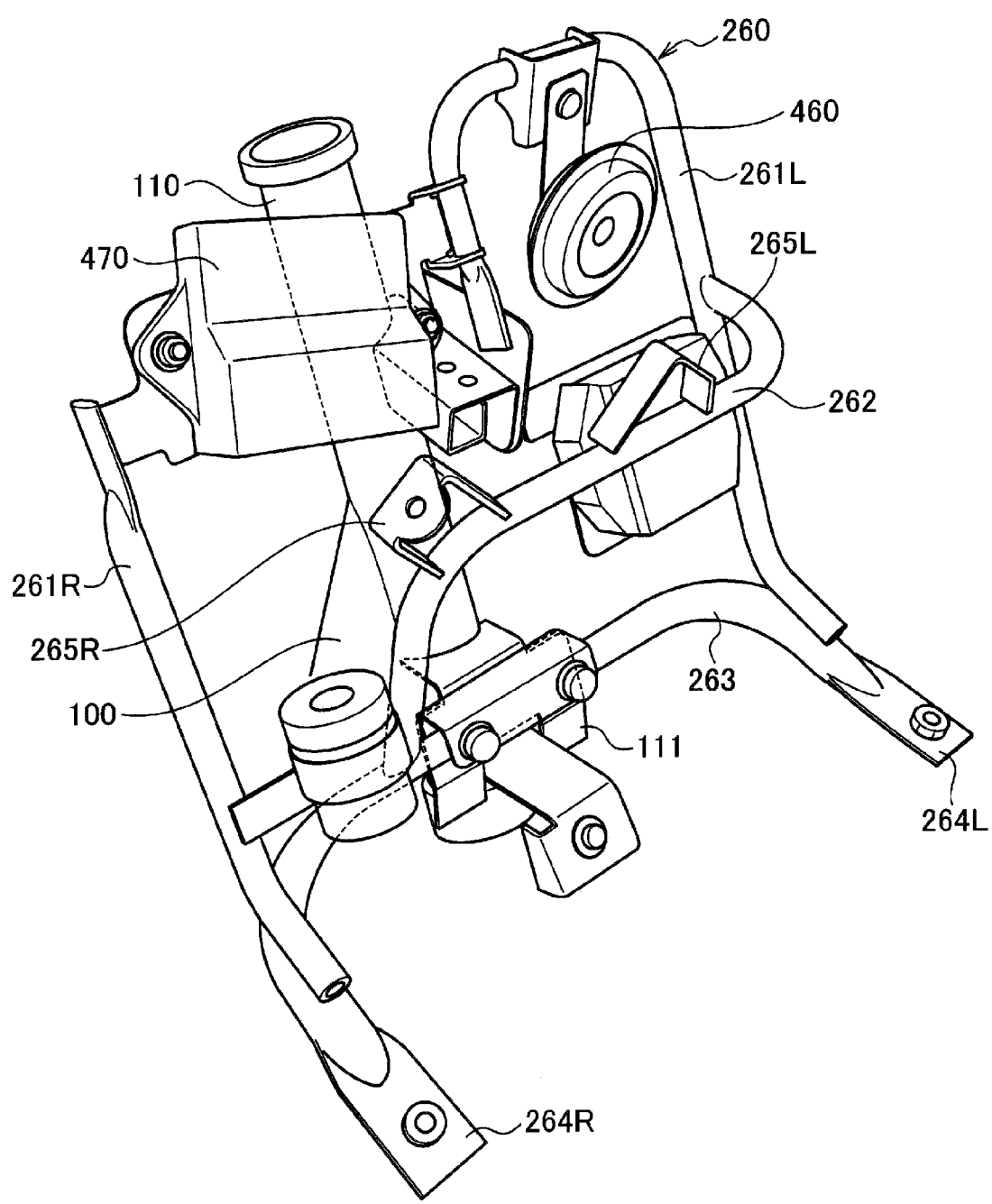

[Fig. 13]
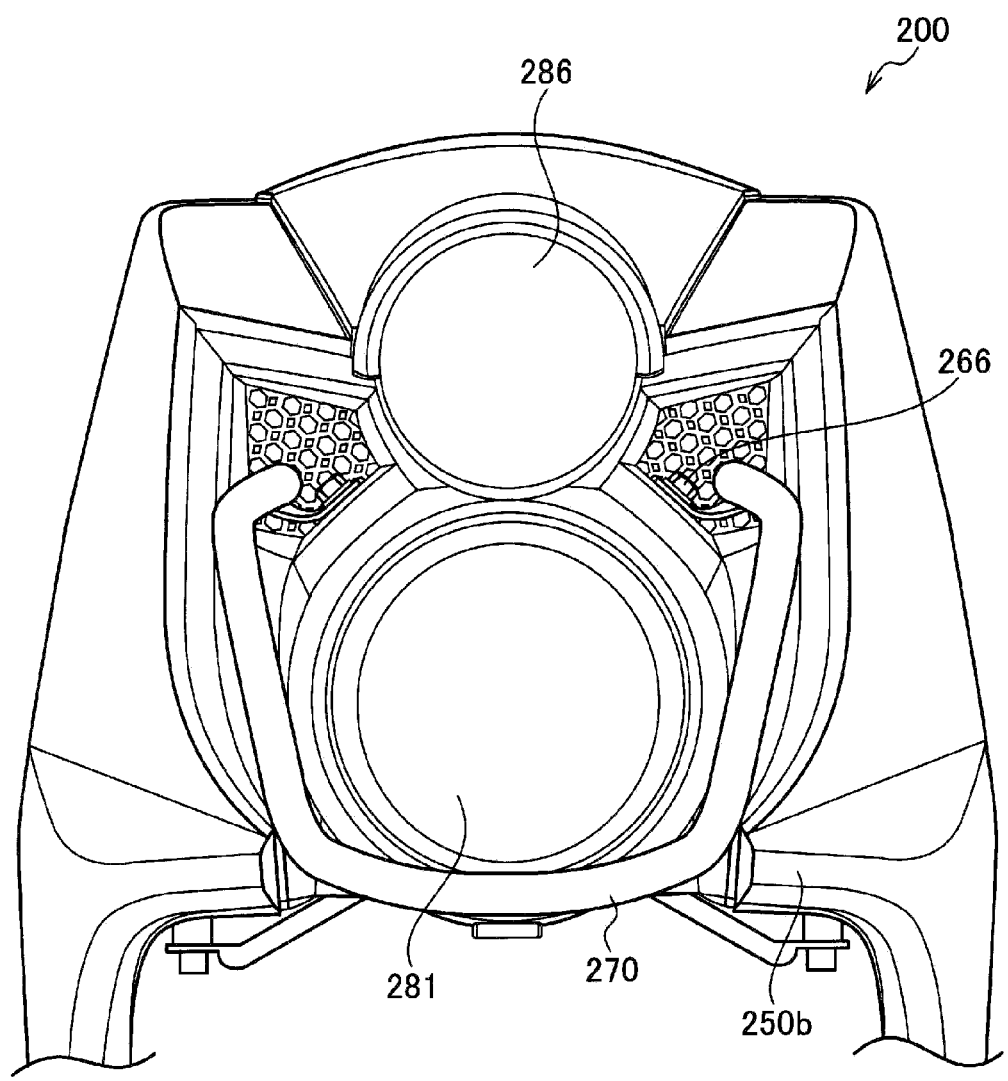

[Fig. 14]
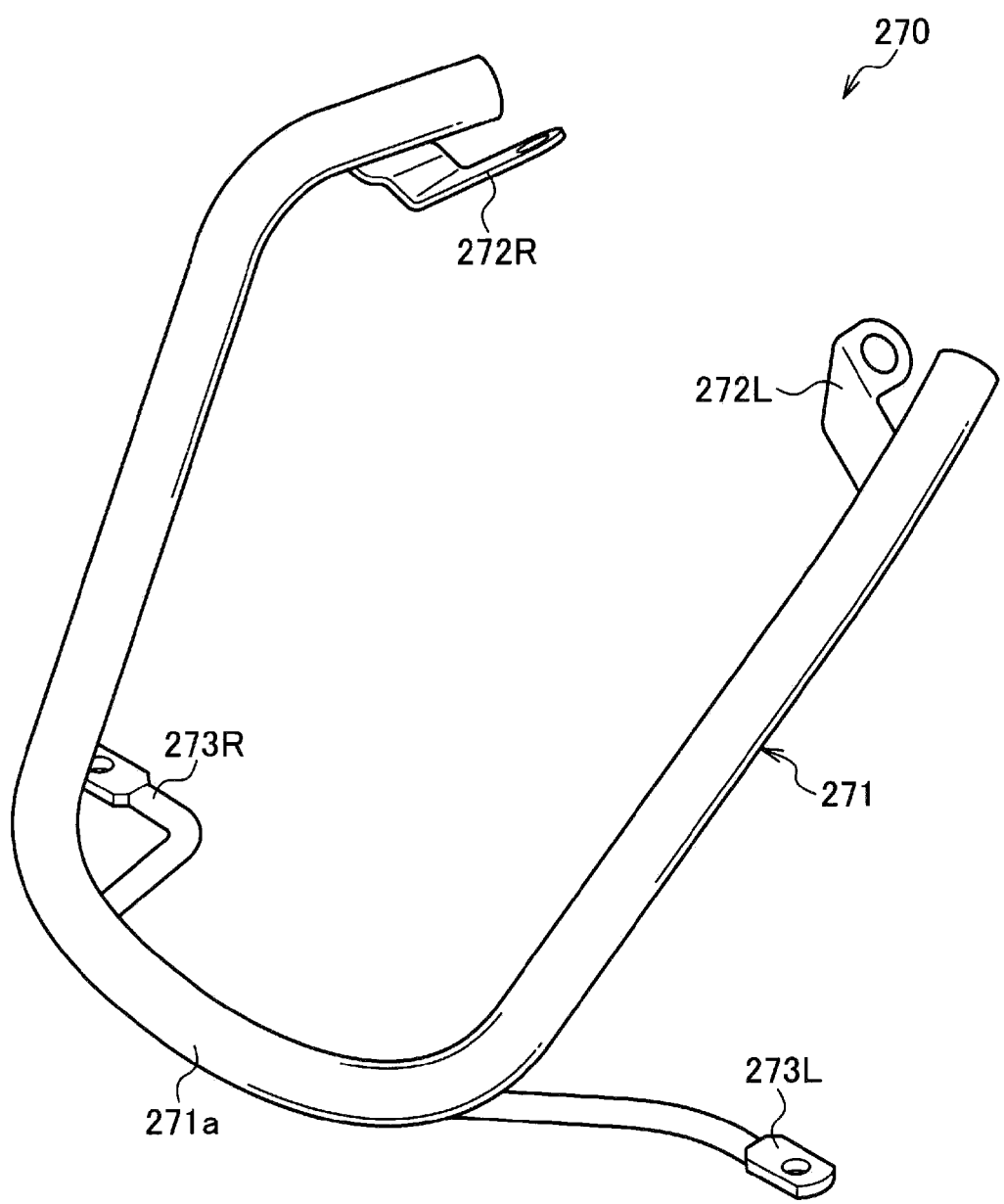

[Fig. 15]
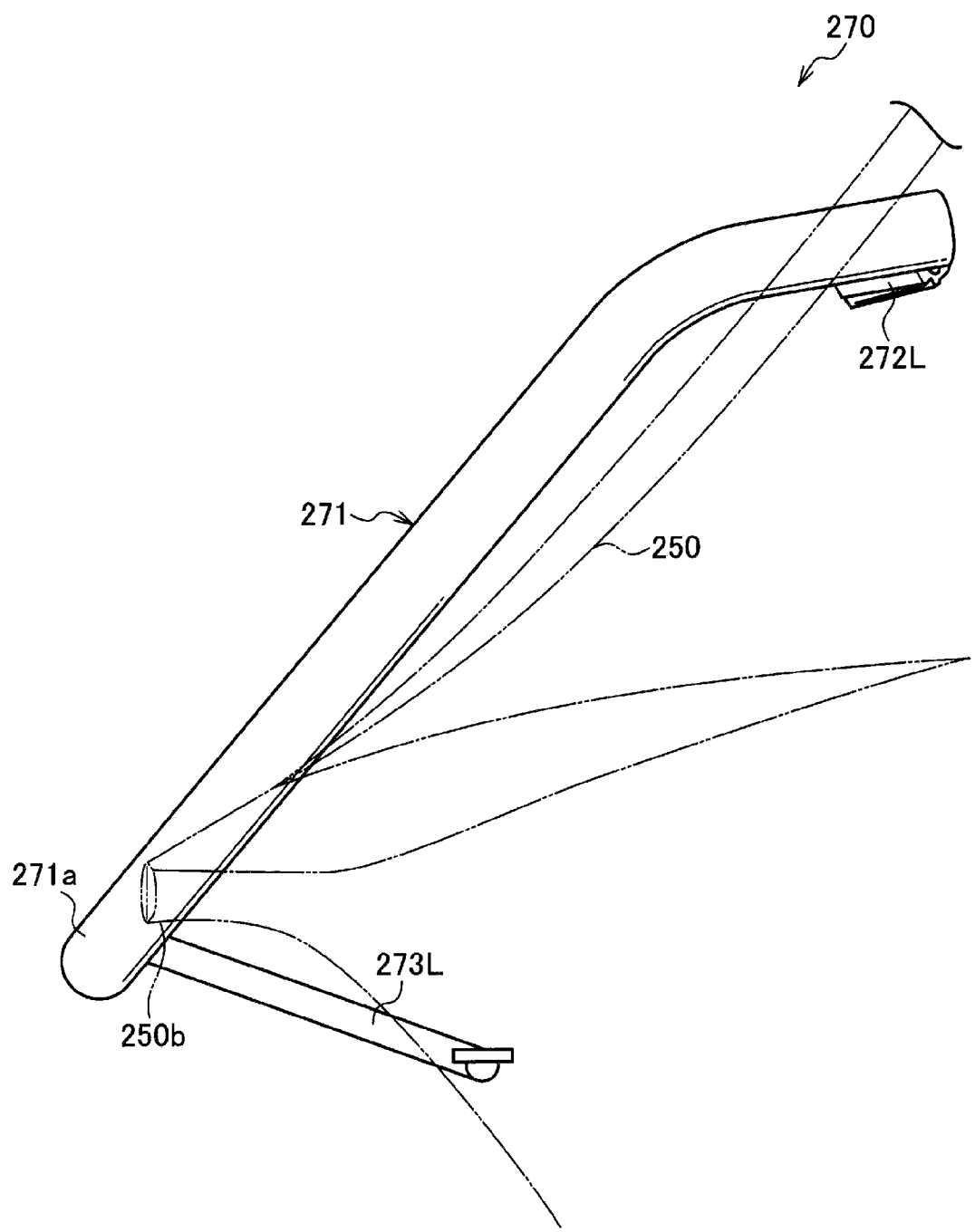

[Fig. 16]
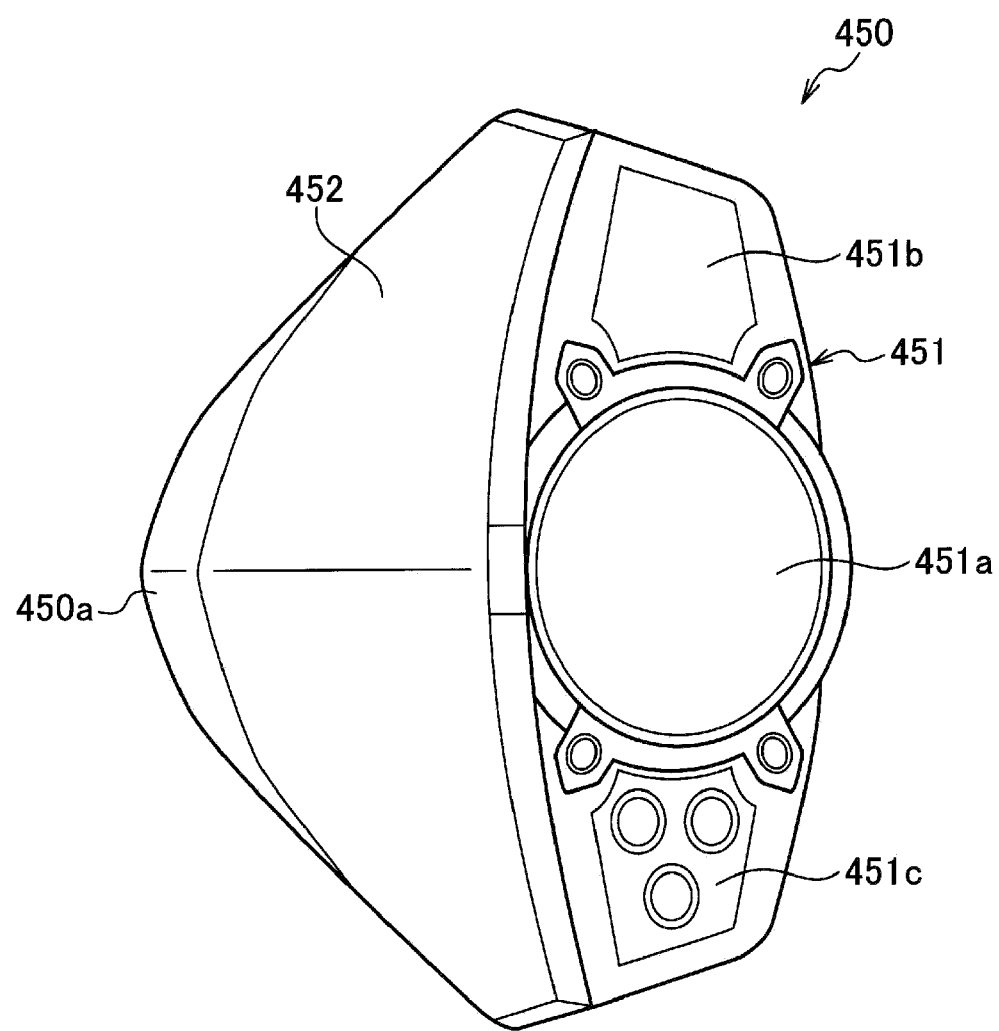

[Fig. 17]
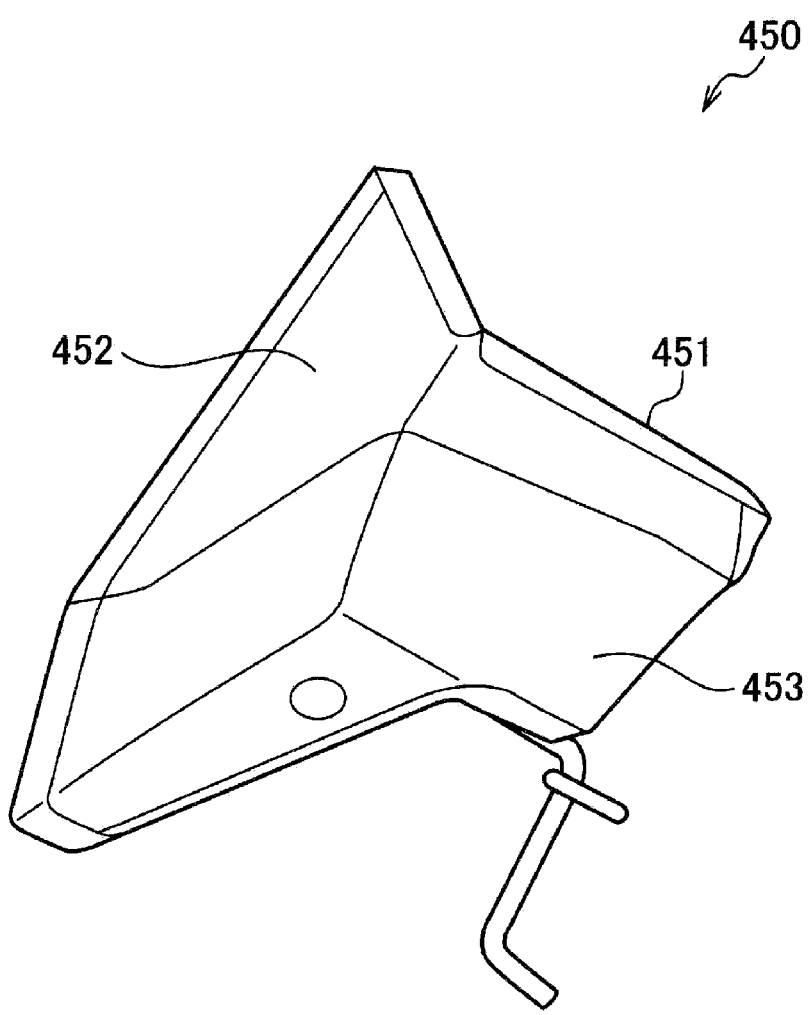

STRADDLE-TYPE VEHICLE

BACKGROUND OF THE INVENTION

1. Technical Field

The present invention relates to a straddle-type vehicle including a plurality of lighting devices that are disposed above a front wheel, and a front cover part provided with the plurality of lighting devices and arranged to cover at least a portion of the legs of a rider.

2. Related Art

In a straddle-type vehicle such as a motorcycle, a structure has been proposed in which a head light (lighting device) is disposed above a front wheel and in which a front side cowl for covering at least a portion of the legs of a rider is disposed on both left and right sides of the head light (see patent document 1).

In the straddle-type vehicle, from the viewpoint of increasing an area irradiated by the head light and a request in design, two head lights are disposed along the up and down direction of the vehicle in a central portion with respect to a vehicle width direction. Moreover, the straddle-type vehicle is provided with a cover for covering the lenses of the two head lights arranged in the up and down direction. The cover is formed so as to connect to the front side cowl disposed on both left and right sides of the head light.

Patent Document 1: Japanese Unexamined Patent Publication No. 2007-38865 (page 4, FIG. 2).

However, in the conventional straddle-type vehicle described above, the cover for covering the head light needs to be increased so as to ensure the area irradiated by the head light is not reduced. Hence, the front projection area of the straddle-type vehicle is increased, which raises a problem that decreasing air resistance effectively is difficult.

SUMMARY OF THE INVENTION

Thus, the present invention has been made in view of these circumstances. The object of the present invention is to provide a straddle-type vehicle that can ensure the projection area of a lighting device such as a head light is not reduced, and which can reduce air resistance.

To solve the above-mentioned problem, the present invention has the following aspects. Firstly, a straddle-type vehicle in accordance with a first aspect of the present invention includes a first lighting device and a second lighting device that are disposed above a front wheel, and a front cover part provided with the first and second lighting devices, and to cover at least a portion of legs of a rider, and is characterized in that the first lighting device has a first lens. The second lighting device has a second lens. The first and second lighting devices protrude forward of a front edge of the front cover part and are arranged along an up and down direction with respect to the vehicle. At least a portion of the first and second lenses is positioned more forwardly, with respect to the vehicle, than is the front edge of the front cover part. The first and second lenses are disposed to be exposed in a forward portion of the vehicle. The front cover part includes a side portion formed on both sides of a maximum width portion of the first and second lenses when the vehicle is viewed from a front side, and a central portion connected to the side portion and formed in a portion closer to a center of the front cover part than the side portion when the vehicle is viewed from the front side. The central portion protrudes forward of the side portion when the vehicle is viewed from a side.

In the above-mentioned conventional straddle-type vehicle, the cover for covering the lenses of the two lighting devices arranged in the up and down direction is formed so as to connect to a front side cowl disposed on the left and right sides of the lighting devices. Therefore, the flow of air can be made smooth and hence air resistance can be reduced.

However, the inventor of the present application moved away from the stereotyped concept of covering the lighting devices, and has designed the construction in which the first and second lenses in the first and second lighting devices that are arranged along the up and down direction of the vehicle are exposed in a forward portion of the vehicle and in which the central portion of the front cover part is protruded forward of the side portion.

The straddle-type vehicle is provided with the first and second lighting devices, which are arranged in the central portion along the up and down direction of the vehicle. Therefore, the straddle-type vehicle can ensure the area irradiated by the lighting devices is the same as before.

Further, the straddle-type vehicle is constructed so as not to have the cover for covering the lens of the lighting device. Therefore, the straddle-type vehicle can reduce its front projection area and hence can reduce the air resistance.

Still further, in the straddle-type vehicle, the central portion of the front cover part protrudes forward of the side portion. Therefore, the straddle-type vehicle can make air easily flow to the left and right and hence can further reduce the air resistance.

Therefore, according to the straddle-type vehicle in accordance with the first aspect, it is possible to ensure the area irradiated by the lighting device is not reduced and to reduce the air resistance more than before.

In this regard, the straddle-type vehicle does not have the cover for covering the lens of the lighting device, and the central portion, in which the first and second lighting devices are arranged, protrudes forward of the side portion. Therefore, the straddle-type vehicle can improve the visibility of the lighting device more than before.

In addition to the first aspect of the present invention, a second aspect of the present invention is characterized in that the second lighting device is arranged upward and rearward of the first lighting device.

In addition to the second aspect of the present invention, a third aspect of the present invention is characterized in that the straddle-type vehicle includes a handlebar used for steering the front wheel. A central portion, with respect to a vehicle width direction, of or connected or proximate to and forward of, the handlebar, protrudes forward and is arranged upward and rearward of the second lighting device.

In addition to the third aspect of the present invention, a fourth aspect of the present invention is characterized in that the front cover part has an outside cover portion formed sideward of the first and second lighting devices. The outside cover portion has a substantially smooth face formed thereon. The smooth face is inclined rearward and upward with respect to the straddle-type vehicle. The height of the smooth face is not less than the height of the first and second lighting devices when the straddle-type vehicle is viewed from a front side.

In addition to the fourth aspect of the present invention, a fifth aspect of the present invention is characterized in that the outside cover part has a projecting portion projecting outward in a vehicle width direction.

In addition to the fifth aspect of the present invention, a sixth aspect of the present invention is characterized in that the outside cover part has a substantially smooth face formed thereon. The smooth face is inclined rearward and upward with respect to the straddle-type vehicle. The projecting portion is inclined more rearward than the smooth face.

In addition to the sixth aspect of the present invention, a seventh aspect of the present invention is characterized in that the straddle-type vehicle further includes a foot rest part arranged behind a steering head pipe and disposed in front of a seat on which a rider can be seated, and a lower cover part extended upward with respect to the straddle-type vehicle, from the foot rest part and arranged to be in front of legs of the rider. The projecting portion has its lower portion connected to the lower cover part.

In addition to the seventh aspect of the present invention, an eighth aspect of the present invention is characterized in that the outside dimension of the second lighting device is smaller than the outside dimension of the first lighting device.

In addition to the eighth aspect of the present invention, a ninth aspect of the present invention is characterized in that each of the first and second lighting devices is formed in a circular shape when the straddle-type vehicle is viewed from the front side.

BRIEF DESCRIPTION OF THE DRAWINGS

FIG. 1 is a left side view of a motorcycle 10 according to an embodiment of the present invention.

FIG. 2 is a perspective view of the motorcycle 10 according to the embodiment of the present invention.

FIG. 3 is a front view of the motorcycle 10 according to the embodiment of the present invention.

FIG. 4 is a plan view of the motorcycle 10 according to the embodiment of the present invention.

FIG. 5 is a front view of a front cover 200 according to the embodiment of the present invention.

FIG. 6 is a left side view of the front cover 200 according to the embodiment of the present invention.

FIG. 7 is a front view of a head light cover 210 according to the embodiment of the present invention.

FIG. 8 is a front view of an outside cover 250 according to the embodiment of the present invention.

FIG. 9 is a perspective view of an upper cover 290 according to the embodiment of the present invention.

FIG. 10 is a sectional view, taken on a line F10-F10 shown in FIG. 5, of the front cover 200.

FIG. 11 is a view of a head light 281 according to the embodiment of the present invention as seen from above a front portion thereof.

FIG. 12 is a perspective view, from a right front side, of a support bracket 260 according to the embodiment of the present invention.

FIG. 13 is a front view of the front cover 200 according to the embodiment of the present invention with a head light guard 270 attached.

FIG. 14 is a perspective view of the head light guard 270 according to the embodiment of the present invention.

FIG. 15 is another perspective view of the head light guard 270 according to the embodiment of the present invention.

FIG. 16 is a plan view of a meter unit 450 according to the embodiment of the present invention.

FIG. 17 is a left side view of the meter unit 450 according to the embodiment of the present invention.

DETAILED DESCRIPTION OF THE INVENTION

Next, embodiments of a straddle-type vehicle according to the present invention will be described with reference to the drawings. Specifically, (1) general schematic construction of straddle-type vehicle, (2) construction of front portion of straddle-type vehicle, (3) structure and attachment of lighting device, (4) support structure of front cover part, (5) shape of protection member, (6) shape of display unit, (7) operation and effect, and (8) other embodiments will be described.

Here, in the following description of the drawings, same or similar parts are designated by same or similar reference numerals. However, it should be noted that the drawings are schematic ones and that the ratios of respective sizes or the like are different from actual ones.

Thus, the specific sizes or the like should be judged by taking into account the following description. Moreover, of course, there are included parts that are different in the relationship and the ratio of their sizes from the drawings.

(1) General Schematic Construction of Straddle-Type Vehicle

FIG. 1 is a left side view of a motorcycle 10 forming a straddle-type vehicle in the embodiment. FIGS. 2 to 4 show a perspective view, a front view, and a plan view of the motorcycle 10, respectively.

The motorcycle 10 has a front wheel 20 and a rear wheel 90. The motorcycle 10 is a so-called scooter type motorcycle in which a space S is formed in front of a seat 80 on which a rider, specifically, a main rider to drive the motorcycle 10, can be seated. The space S is formed so as to accommodate the legs of the main rider when the main rider mounts or dismounts, to thereby facilitate the main rider's mounting or dismounting.

The motorcycle 10 has a large-size front fender 400 and a mud guard 640 so as to handle off-road running.

The front wheel 20 has an axle 20a supported by front forks 21L, 21R. The front forks 21L, 21R support the side ends of the axle 20a, respectively. When the front wheel 20 is steered by using a handlebar 23, the front forks 21L, 21R are turned by the steering operation, along with the front wheel 20, to the right or the left with respect to a direction in which the motorcycle 10 travels.

The front forks 21L, 21R are coupled to each other by an under bracket (not shown). Moreover, a steering shaft (not shown) is rotatably supported by a steering head pipe 110 and coupled to the under bracket.

A leg shield 30 is arranged behind the front wheel 20. The leg shield 30 is positioned to be in front of the legs of the main rider to thereby prevent running wind from directly hitting the legs of the main rider. A foot board 40 is coupled to the leg shield 30.

The foot board 40 is disposed in front of and below the seat 80. Both feet of the main rider can rest on the foot board 40. A lower cover 35 is arranged below the foot board 40. Foot board 40 may include a surface 41 (see FIG. 4).

The lower cover 35 is extended upward, with respect to the motorcycle 10, from the foot board 40, specifically, from below the foot board 40, and is arranged to be in front of the legs of the main rider. Specifically, the lower cover 35 is interposed between the front wheel 20 and the leg shield 30. The lower cover 35 is coupled to the leg shield 30, the foot board 40, and a front cover 200.

A unit swing type engine 50 is arranged behind the foot board 40. The unit swing type engine 50 is used as the power unit of the motorcycle 10. Specifically, the unit swing type engine 50 drives the rear wheel 90 via a drive belt (not shown).

The seat 80 is arranged above the unit swing type engine 50. The main rider and a tandem rider can be seated on the seat 80. The seat 80 is supported by a vehicle body frame 100 forming the skeletal frame of the motorcycle 10. The seat 80 is arranged behind the steering head pipe 110 disposed on the vehicle body frame 100.

The front cover 200 covers the front portion of the motorcycle 10. The front cover 200 is arranged in front of the steering head pipe 110 and above the front wheel 20. In other words, the front cover 200 can cover at least a portion of the legs of the main rider when the legs are rested on the foot board 40, on the front side of the motorcycle 10.

Moreover, a meter unit 450 for displaying the state (for example, running speed) of the motorcycle 10 is arranged above the front cover 200. In the embodiment, the meter unit 450 forms a central portion of, with respect to a vehicle width direction, or is connected or proximate to and forward of, a handlebar 23. The meter unit 450 protrudes forward.

(2) Construction of Front Portion of Straddle-Type Vehicle

Next, the construction of the front portion of the straddle-type vehicle, specifically, the construction of the front cover 200, will be described with reference to FIG. 5 to FIG. 9.

FIG. 5 is a front view of the front cover 200. FIG. 6 is a left side view of the front cover 200.

FIG. 7 is a front view of a head light cover 210 component of the front cover 200. FIG. 8 is a front view of an outside cover 250 component of the front cover 200. FIG. 9 is a perspective view of an upper cover 290 component of the front cover 200.

(2.1) General Construction of Front Portion of Straddle-Type Vehicle

As shown in FIG. 5 and FIG. 6, a head light 281 and an auxiliary light 286 are disposed on the front cover 200. In the embodiment, the head light 281 forms a first lighting device. The auxiliary light 286 forms a second lighting device. The head light 281 and the auxiliary light 286 are disposed along a longitudinal direction (D1 direction in the drawing) above the front wheel 20 (see FIG. 1 to FIG. 3). Here, the meter unit 450 is arranged upward and rearward of the auxiliary light 286.

The head light 281 illuminates an area ahead of the motorcycle 10. The auxiliary light 286 is used as the auxiliary light of the head light 281. Here, the auxiliary light 286 may be used as a position lamp.

The head light 281 and the auxiliary light 286 are disposed separately from each other in the longitudinal direction. The shapes of the head light 281 and the auxiliary light 286 are circular respectively when the motorcycle 10 is viewed from the front side. Moreover, the outer dimensions of the auxiliary light 286 are smaller than the outer dimensions of the head light 281.

The head light 281 and the auxiliary light 286 are disposed stepwise when the motorcycle 10 is viewed from the side. Specifically, the auxiliary light 286 is disposed upward and rearward of the head light 281.

The front cover 200 has the head light cover 210, the outside cover 250, and the upper cover 290.

The head light cover 210 is disposed around the head light 281 and downward and sideward of the auxiliary light 286. In other words, the head light cover 210 is formed along and/or around the outer shapes of the head light 281 and the auxiliary light 286.

The outside cover 250 is formed outside, in a vehicle width direction, of the head light cover 210. In other words, the head light cover 210 and the outside cover 250 are formed as separate parts, respectively. The upper cover 290 is disposed on the top of the outside cover 250.

The outside cover 250 has a side portion 251d formed on both sides of a maximum width portion Wmax of the head light 281 when the vehicle is viewed from the front side. The head light cover 210 forms a central portion formed in a portion closer to a center of the front cover 200 than the side portion 251d when the vehicle is viewed from the front side. The head light 281 and the auxiliary light 286 protrude forward with respect to the vehicle further than the front end 251c of the outside cover 250 when the vehicle is viewed from the side.

The outside cover 250 has a substantially smooth face 251 formed thereon. The smooth face 251 is inclined rearward and upward with respect to the motorcycle 10. Specifically, the smooth face 251 of the outside cover 250 is inclined rearward and upward at an inclined angle α. Moreover, the front end portion 250b of the outside cover 250 is positioned in front of the head light 281.

In the embodiment, the height H1 of the smooth face 251 is larger than the height H2 of the head light 281 and the auxiliary light 286 when the motorcycle 10 is viewed from the front side.

The front cover 200 is supported by a support bracket 260 (not shown in FIG. 5 to FIG. 9, see FIG. 12) attached to the steering head pipe 110.

(2.2) Shape of Head Light Cover 210

As shown in FIG. 7, the head light cover 210 has a head light attaching part 211 and an auxiliary light attaching part 212. The head light 281 is attached to the head light attaching part 211. The auxiliary light 286 is attached to the auxiliary light attaching part 212.

Moreover, the head light cover 210 has a bent portion 216 that is bent to form a ridge line RL. The bent portion 216 is formed at an outer edge portion 231 formed on the outer edge of the head light attaching part 211. Here, the head light cover 210 has a bilaterally symmetric shape when it is viewed from the front side, so that in FIG. 7 only portions positioned on the left side thereof are denoted by reference numerals.

A depressed portion 220 depressed rearward with respect to the motorcycle 10 is formed above the bent portion 216.

The depressed portion 220 is formed near the head light 281 and the auxiliary light 286. Specifically, a portion of the depressed portion 220 is positioned inside a straight line L1 shown in FIG. 5, in other words, closer to the center of the motorcycle 10 when the motorcycle 10 is viewed from the front side. The straight line L1 passes an outside end 231a (see FIG. 7) of the outer edge portion 231 positioned outside the head light 281, and passes an outside end 291a (see FIG. 9) of an outer edge portion 291.

A plurality of holes 221 are formed in the bottom face 220a of the depressed portion 220. The hole 221 is pentagonal. The head light cover 210 has the bent portion 216 and the depressed portion 220 and hence is formed in a more projected and depressed shape than the outside cover 250.

The head light cover 210 has engaging parts 213A, 213B and 213C. The engaging parts 213A to 213C are engaged with bosses (not shown) disposed on the outside cover 250. The head light cover 210 and the outside cover 250 are coupled to each other by tapping screws (not shown).

(2.3) Shape of Outside Cover 250

As shown in FIG. 8, the outside cover 250 has a left cover region 252L, a right cover region 252R, and a coupling portion 252a.

The left cover region 252L is formed on one side, specifically, on the left side of the head light cover 210. The right cover region 252R is formed on the other side, specifically, on the right side of the head light cover 210. In other words, the outside cover 250 is formed on the sides of the head light 281 and the auxiliary light 286.

The left cover region 252L and the right cover region 252R are coupled to each other at a portion of the periphery of the head light cover 210. Specifically, the left cover region 252L and the right cover region 252R are coupled to each other upward of the head light cover 210. In other words, the left cover region 252L and the right cover region 252R are coupled to each other via the coupling portion 252a positioned above the head light cover 210.

The outside cover 250 has a projecting region 251a. Here, like FIG. 7, the outside cover 250 has a bilaterally symmetric shape, so in FIG. 8 only portions positioned on the left side are denoted by reference numerals.

The projecting region 251a is formed on the smooth face 251. The projecting region 251a projects outward in the vehicle width direction of the width W1 (see FIG. 3) of the front fork 21L and the front fork 21R when the motorcycle 10 is viewed from the front side.

Moreover, the outside cover 250 has a projecting region 251b. The projecting region 251b projects outward in the vehicle width direction of the smooth face 251. The projecting region 251b is formed below the projecting region 251a. Specifically, the projecting region 251b is formed in a lower end portion 250a of the outside cover 250.

As shown in FIG. 6, the projecting region 251b is more inclined rearward than is the projecting region 251a. The projecting region 251a is inclined rearward and upward at the inclined angle α. On the other hand, the projecting region 251b is more greatly inclined rearward than is the smooth face 251, specifically, the projecting region 251a, in other words, at an inclined angle larger than the inclined angle α.

The lower cover 35 is coupled to the lower portion of the projecting region 251b. Moreover, the upper portion 30a of the leg shield 30 is inclined rearward and upward according to the inclined angle α of the smooth face 251.

(2.4) Shape of Upper Cover 290

As shown in FIG. 9, the upper cover 290 has the outer edge portion 291 shaped to fit along and/or around the periphery of the auxiliary light 286. In other words, the outer edge portion 291 is formed on, e.g., disposed at, the outer edge of the auxiliary light 286.

The upper cover 290 is attached to the coupling portion 252a (see FIG. 8) of the left cover region 252L and the right cover region 252R. As shown in FIG. 5, the upper cover 290 is shaped like an arch when the motorcycle 10 is viewed from the front side.

In this regard, the lens 287 of the auxiliary light 286 protrudes forward of the outer edge portion 291 of the upper cover 290 when the vehicle is viewed from the side (see FIG. 6 and FIG. 10).

(3) Structure and Attachment of Lighting Device

Next, the structure and the attachment of a lighting device attached to the front cover 200, specifically, the head light 281 and the auxiliary light 286, will be described with reference to FIG. 10 and FIG. 11.

FIG. 10 is a sectional view, taken on a line F10-F10 shown in FIG. 5, of the front cover 200. FIG. 11 is a view of the head light 281 from above a front portion thereof.

As shown in FIG. 10, the head light 281 and the auxiliary light 286 are arranged stepwise when the motorcycle 10 is viewed from the side. Specifically, the auxiliary light 286 is arranged upward and rearward of the head light 281.

The head light 281 has a lens 282, a bulb 283, and a reflector 284.

The lens 282 is fitted in the reflector 284. The lens 282 is inclined at a smaller angle than is the outside cover 250, specifically, the smooth face 251 of the outside cover 250, when the motorcycle 10 is viewed from the side. In other words, an inclined angle of the lens 282 is smaller than the inclined angle α (see FIG. 6).

The periphery of the lens 282 is covered by the outer edge portion 231 of the head light cover 210.

As shown in FIG. 11, the front edge portion 284a of the reflector 284 is circular. Moreover, in the embodiment, the front edge portion 284a is formed in a shape projected and depressed repeatedly at substantially equal intervals, e.g., the front edge portion 284a is serrated.

The auxiliary light 286 has a lens 287 and a bulb 288. The lens 287 is fitted in the auxiliary light attachment part 212 of the head light cover 210. The lens 287, specifically, the front portion of the bulb 288, like the lens 282, is also inclined at a smaller angle than is the outside cover 250, specifically, an angle of incline of the smooth face 251 when the motorcycle 10 is viewed from the side. The lens 287 is formed in the shape of a curved face protruding forward with respect to the vehicle.

The lens 282 and the lens 287 protrude from or beyond the surface of the front cover 200, in other words, e.g., beyond the smooth face 251 when the motorcycle 10 is viewed from the side.

(4) Support Structure of Front Cover Part

Next, the support structure of the front cover part, that is, the front cover 200, will be described with reference to FIG. 12. FIG. 12 is a perspective view, when viewed from a right front side, of the support bracket 260 attached to the steering head pipe 110.

As shown in FIG. 12, the support bracket 260 is attached to a bracket attaching part 111 disposed on the steering head pipe 110.

The support bracket 260 has longitudinal pipe parts 261L, 261R, a lateral pipe part 262, and a lower pipe part 263. The support bracket 260 supports the front cover 200, in other words, the head light cover 210, to which the head light 281 and the auxiliary light 286 are attached, and the outside cover 250 with which the head light cover 210 is combined.

The longitudinal pipe parts 261L, 261R are joined to the lower pipe part 263. A horn 460 is attached to the longitudinal pipe part 261L. The horn 460 produces a sonic signal of a specified sound level when a main rider presses down a horn button (not shown). The horn 460 is arranged behind the bottom face 220a of the depressed portion 220.

A main switch unit 470 for turning on or off electric power to be supplied to electric parts such as a starter (not shown) mounted on the motorcycle 10 is interposed between the longitudinal pipe part 261L and the longitudinal pipe part 261R. The main switch unit 470 can be operated by using a main key (not shown). The slot of the main key is disposed in the upper portion 30a of the leg shield 30.

The lateral pipe part 262 is joined to the longitudinal pipe part 261L and the lower pipe part 263. Support stay parts 265L, 265R are disposed on the lateral pipe part 262. The head light cover 210 is attached to the support stay parts 265L, 265R. Specifically, a bolt hole 214 (see FIG. 7) formed in the head light cover 210 is arranged to overlap a screw hole (not shown) formed in the support stay part 265L (265R).

The lower pipe part 263 is fixed to the bracket attaching part 111. The head light cover 210 is also attached to the support stay parts 264L, 264R at the front ends of the lower pipe part 263. Specifically, a bolt hole 215 (see FIG. 7) formed in the head light cover 210 is arranged to overlap a screw hole (not shown) formed in the support stay part 264L (264R).

As shown in FIG. 5 and FIG. 7, a bolt 266 is passed through the bolt hole 214 and is screwed into the screw hole formed in the support stay part 265L (265R). Here, although not shown in FIG. 5, a bolt of the same shape as the bolt 266 is passed through the bolt hole 215 and is screwed into the screw hole formed in the support stay part 264L (264R).

Moreover, the position of the support stay part 265L (265R) and the bolt 266 is arranged near the head light 281 and the auxiliary light 286. More specifically, the support stay part 265L (265R) is disposed on an inner wall surface (not shown) forming the depressed portion 220.

Specifically, the position of the bolt 266 is arranged inside the straight line L1 shown in FIG. 5, in other words, closer to the center of the motorcycle 10 when the motorcycle 10 is viewed from the front side.

The straight line L1 passes the outside end 231a (see FIG. 7) of the outer edge portion 231, positioned outside the head light 281, and the outside end 291a (see FIG. 9) of the outer edge portion 291.

(5) Shape of Protection Member

Next, the shape of a protection member arranged in front of the front cover 200 will be described with reference to FIG. 13 to FIG. 15.

FIG. 13 is a front view of the front cover 200 to which a head light guard 270 forming the protection member in the embodiment is attached. FIG. 14 is a perspective view of the head light guard 270. Moreover, FIG. 15 is a left side view of the head light guard 270.

The head light guard 270 can be attached, as optional equipment, to the front cover 200 (support bracket 260).

The head light guard 270 is arranged along the periphery of the head light 281 and the auxiliary light 286. Specifically, the head light guard 270 is arranged downward and sideward of the head light 281 and downward of the auxiliary light 286. In other words, the head light guard 270 is arranged in front of the front cover 200 and is separated from the head light 281 and the auxiliary light 286.

The head light guard 270 is shaped like a round bar. Specifically, the head light guard 270 is formed of a round pipe member.

The head light guard 270 has a guard pipe part 271, upper stay parts 272L, 272R, and lower stay parts 273L, 273R.

The guard pipe part 271 is formed in the shape of a letter U with a lower part 271a when the vehicle is viewed from the front side. The upper stay part 272L (272R) is fixed to the support stay part 265L (265R) along with the head light cover 210 (see FIG. 12). The lower stay part 273L (273R) is fixed to the support stay part 264L (264R) along with the head light cover 210 (see FIG. 12).

Moreover, as shown in FIG. 15, the head light guard 270 is arranged in front of the outside cover 250 and is separated from the outside cover 250.

(6) Shape of Display Unit

Next, the shape of a meter unit 450 forming a display unit in the embodiment will be described with reference to FIG. 16 and FIG. 17. FIG. 16 is a plan view of the meter unit 450. FIG. 17 is a left side view of the meter unit 450.

As shown in FIG. 16 and FIG. 17, the meter unit 450 has a display part 451, a front panel part 452, and a body part 453.

The display part 451 displays the state of the motorcycle 10. Specifically, a speedometer 451a, a fuel meter 451b, and an alarm lamp part 451c are disposed on the display part 451.

The front panel part 452 is attached to the body part 453. The front portion of the meter unit 450, specifically, the front panel part 452 is extended along the inclination of the smooth face 251 of the outside cover 250 when the motorcycle 10 is viewed from the side.

Moreover, the lower edge portion 450a of the meter unit 450 is formed in the shape of a letter V when the motorcycle 10 is viewed from the front side or in a plan view.

(7) Operation and Effect

According to the motorcycle 10, the lens 282 and the lens 287 in the head light 281 and the auxiliary light 286 arranged along the up and down direction of the vehicle are exposed in a forward portion of the vehicle. The head light cover 210 protrudes forward of the side portion 251d when the vehicle is viewed from the side.

The area irradiated by the lighting device can be ensured to not be reduced by mounting head light 281 and the auxiliary light 286 on the head light cover 210 along the up and down direction of the vehicle.

Further, the motorcycle 10 employs the construction in which the lighting device presents a reduced front area, so that the motorcycle 10 can reduce its front projection area and hence can reduce the air resistance.

Furthermore, the head light cover 210 is protruded forward of the side portion 251d, so that the air can be made to easily flow to the left and right sides and hence the air resistance can be further reduced.

According to the motorcycle 10, a cover for covering the lens of the lighting device may not be included, and the head light cover 210, on which the head light 281 and the auxiliary light 286 are arranged, and/or at least partly framing the headlight 281 and auxiliary light 286, is protruded forward of the side portion 251d. Thus, this can improve the visibility of the head light 281 and the auxiliary light 286 more than before.

Further, as compared with a conventional construction in which the cover for covering the lens of the lighting device is disposed, it is possible to reduce a reduction in the quantity of light emitted from the head light 281 and the auxiliary light 286.

The lens 282 of the head light 281 and the lens 287 of the auxiliary light 286 are inclined at a smaller angle than is the outside cover 250 when the motorcycle 10 is viewed from the side. Specifically, the head light 281 and the auxiliary light 286 are arranged stepwise when the motorcycle 10 is viewed from the side. Moreover, the lens 282 and the lens 287 protrude from or beyond the smooth face 251 formed on the front cover 200.

In other words, the distance that light emitted from the bulb 283 (bulb 288) travels when it passes through the interior of the lens 282 (lens 287) is shorter as compared with a case where the lens 282 and the lens 287 are inclined along the outside cover 250. Hence, a reduction in the quantity of light emitted via the lens 282 (lens 287) can be prevented.

In the embodiment, the outside cover 250 is inclined rearward and upward at the inclined angle α. Moreover, the front end portion 250b of the outside cover 250 is positioned in front of the head light 281. Furthermore, the front panel part 452 of the meter unit 450 is extended along the inclination of the outside cover 250 when the motorcycle 10 is viewed from the side. Hence, the air resistance of the front cover 200 can be reduced.

In the embodiment, the height H1 of the smooth face 251 of the outside cover 250 is larger than the height H2 of the head light 281 and the auxiliary light 286. Moreover, the outside cover 250 has the projecting region 251b.

Moreover, the smooth face 251 is formed on both sides of the head light cover 210, specifically, in the left cover region 252L and the right cover region 252R. The lower cover 35 is coupled to the lower portion of the projecting region 251b.

Accordingly, a reduction in the quantity of light emitted via the lens 282 (lens 287) can be prevented by reducing the inclination of the lens 282 (lens 287), and the air resistance around the front cover 200 can be further reduced.

Moreover, in the embodiment, the projecting region 251b is more greatly inclined rearward than is the smooth face 251. Hence, a force to press the motorcycle 10 downward (down force) can be produced by the air resistance around the front cover 200, in particular, by the running wind passing over the surface of the front cover 200.

In the embodiment, the lens 287 of the auxiliary light 286 is formed in the shape of the curved face protruding forward.

The air can be made to more easily flow and hence the air resistance can be reduced by employing the curved face. Moreover, the visibility of the auxiliary light 286 can be improved by protruding the lens 287 forward.

(8) Other Embodiments

As described above, the contents of the present invention have been disclosed through one embodiment of the present invention, but it should be understood that the descriptions and the drawings forming a portion of this disclosure do not limit the present invention. Various alternative embodiments will be apparent to those skilled in the art from the disclosure.

For example, the above-mentioned embodiment can be constructed so that the inclination angles of both of the lens 282 of the head light 281 and the lens 287 of the auxiliary light 286 are smaller than that of the outside cover 250 when the motorcycle 10 is viewed from the side. However, the motorcycle 10 may be constructed in such a way that the inclination angle of any one of the lens 282 and the lens 287 is smaller than that of the outside cover 250.

In the above-mentioned embodiment, the head light 281 and the auxiliary light 286 are circular, but any one of the head light 281 and the auxiliary light 286 or both of the lights are not necessarily circular. Moreover, the outer dimensions of the auxiliary light 286 may be similar to those of the head light 281.

In the above-mentioned embodiment, the bent portion 216 and the depressed portion 220 are formed on the head light cover 210. However, if the head light cover 210 is formed in the depressed and projected shape, the bent portion 216 and the depressed portion 220 are not necessarily formed.

In the above-mentioned embodiment, the height H1 of the smooth face 251 of the outside cover 250 is made larger than the height H2 of the head light 281 and the auxiliary light 286. However, the height H1 may be substantially equal to the height H2 or smaller than the height H2.

Moreover, the projecting region 251*a* and the projecting region 251*b* are not necessarily formed.

In the above-mentioned embodiment, the lens 287 of the auxiliary light 286 is formed in the shape of the curved face protruding forward of the front edge of the outer edge portion 291 when the vehicle is viewed from the side. However, the lens 287 is not necessarily formed in the shape of the curved face but may be formed in the shape of a flat face inclined rearward.

As described above, of course, the present invention includes various embodiments not described above. Thus, it should be understood that the technical scope of the present invention is defined only by the specified terms of the invention as claimed in the claims that are appropriate from the above descriptions.

Industrial Applicability

As described above, the present invention can ensure an area irradiated by the lighting device such as the head light not reduced and can reduce the air resistance. Thus, the present invention is useful for the straddle-type vehicle such as the motorcycle.

The invention claimed is:

1. A straddle-type vehicle comprising:
   first and second lighting devices disposed above a front wheel; and
   a front cover part provided with the first and second lighting devices and to cover at least a portion of legs of a rider, wherein
   the first lighting device has a first lens,
   the second lighting device has a second lens,
   the first and second lighting devices protrude forward of a front edge of the front cover part and are arranged along an up and down direction with respect to the vehicle,
   at least a portion of the first and second lenses is positioned more forwardly, with respect to the vehicle, than is the front edge of the front cover part,
   the first and second lenses are disposed to be exposed in a forward portion of the vehicle; and
   wherein the front cover part includes
   a side portion formed on both sides of a maximum width portion of the first and second lenses when the vehicle is viewed from a front side, and
   a central portion connected to the side portion and formed in a portion closer to a center of the front cover part than the side portion when the vehicle is viewed from the front side, and
   the central portion protrudes forward of the side portion when the vehicle is viewed from a side.

2. The straddle-type vehicle as claimed claim 1, wherein the second lighting device is arranged upward and rearward of the first lighting device.

3. The straddle-type vehicle as claimed claim 2, further comprising:
   a handlebar used for steering the front wheel, wherein
   a central portion with respect to a vehicle width direction, forward of the handlebar, protrudes forward and is arranged upward and rearward of the second lighting device.

4. The straddle-type vehicle as claimed claim 1, wherein the front cover part has an outside cover portion formed sideward of the first and second lighting devices,
   the outside cover portion has a substantially smooth face formed thereon,
   the smooth face is inclined rearward and upward with respect to the straddle-type vehicle, and
   a height of the smooth face is not less than a height of the first and second lighting devices when the straddle-type vehicle is viewed from a front side.

5. The straddle-type vehicle as claimed claim 4, wherein the outside cover portion has a projecting portion projecting outward in a vehicle width direction.

6. The straddle-type vehicle as claimed claim 5, wherein the projecting portion is inclined more rearward than is the smooth face.

7. The straddle-type vehicle as claimed claim 5, further comprising:
   a foot rest part arranged behind a steering head pipe and disposed in front of a seat on which a rider can be seated, and
   a lower cover part extended upward, with respect to the straddle-type vehicle, from the foot rest part and arranged to be in front of legs of the rider, wherein
   the projecting portion has a lower portion connected to the lower cover part.

8. The straddle-type vehicle as claimed claim 1, wherein an outside dimension of the second lighting device is smaller than an outside dimension of the first lighting device.

9. The straddle-type vehicle as claimed claim 1, wherein each of the first and second lighting devices is formed in a circular shape when the straddle-type vehicle is viewed from the front side.

\* \* \* \* \*